United States Patent
Chen et al.

(10) Patent No.: US 11,025,579 B2
(45) Date of Patent: Jun. 1, 2021

(54) MESSAGE SPACING SYSTEM WITH BADGE NOTIFICATIONS USING ONLINE AND OFFLINE NOTIFICATIONS

(71) Applicant: Microsoft Technology Licensing, LLC, Redmond, WA (US)

(72) Inventors: Guangde Chen, Milpitas, CA (US); Shipeng Yu, Sunnyvale, CA (US); Shaunak Chatterjee, Sunnyvale, CA (US); Brad Christopher Ciraulo, Redwood City, CA (US); Sandor Nyako, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 287 days.

(21) Appl. No.: 15/967,218

(22) Filed: Apr. 30, 2018

(65) Prior Publication Data
US 2019/0334848 A1    Oct. 31, 2019

(51) Int. Cl.
    *H04L 12/58*    (2006.01)
(52) U.S. Cl.
    CPC .............. *H04L 51/24* (2013.01); *H04L 51/22* (2013.01)
(58) Field of Classification Search
    CPC .......... H04L 51/26; H04L 51/22; H04L 51/24
    See application file for complete search history.

(56) References Cited

U.S. PATENT DOCUMENTS

| | | | |
|---|---|---|---|
| 2010/0156631 A1* | 6/2010 | Roth .................... | G08B 27/005 340/540 |
| 2016/0004410 A1* | 1/2016 | Srinivasan .......... | G06F 3/04842 715/765 |
| 2016/0248865 A1* | 8/2016 | Dotan-Cohen ........ | H04L 67/26 |
| 2016/0350812 A1* | 12/2016 | Priness .............. | G06Q 30/0269 |
| 2017/0308533 A1* | 10/2017 | Lu ........................... | H04L 51/32 |

* cited by examiner

*Primary Examiner* — Shean Tokuta
*Assistant Examiner* — Juan C Turriate Gastulo
(74) *Attorney, Agent, or Firm* — Schwegman Lundberg & Woessner, P.A.

(57) ABSTRACT

A message spacing system evenly distributes the communication of one or more notifications to a computing device communicatively coupled with an online service. The message spacing system also instructs an application residing on the computing device to display a badge notification. The badge notification indicates a number of pending notifications awaiting review by a member of the online service. The badge notification may be overlaid an icon corresponding to an application that the member uses to access or interact with the online service. The badge notification may also be overlaid on an icon displayed on a webpage, where the icon represents a selectable topic that the member may select to interact with the online service. The notifications that the messaging spacing system may send include offline notifications and online notifications.

14 Claims, 9 Drawing Sheets

MESSAGE SPACING SYSTEM WITH BADGE NOTIFICATIONS USING ONLINE AND OFFLINE NOTIFICATIONS

TECHNICAL FIELD

The subject matter disclosed herein generally relates to efficiently spacing delivery times for one or more notifications to be delivered to a user of a computing device, where the user may be a member of an online service that generates notifications in response to activities by other members. In particular, this disclosure relates to an online architecture that retrieves to-be-delivered notifications from one or more datastores, and then determines which of the retrieved notifications are to be delivered to the member.

BACKGROUND

A user of a computing device, such as a smartphone, tablet, or convertible laptop, may use one or more applications to access an online service. The online service may facilitate the exchange of information between members of the service. As the members use the online service, the online service may generate information about the activities carried on by the members. To keep members informed about the activities that each other member engages in, the online service may generate notifications from the information about the members' activities. These notifications may inform a member about work anniversaries, promotions or changes in employment, other members that the member should connect with, news or other events that have recently occurred, and other such notifications or combinations thereof.

As the notifications are generated for a given member of the online service, the online service may communicate the notifications to the given member. Typically, the online service communicates notifications associated with connections (e.g., other members and/or organizations) of the given member or notifications associated with items of interest that are relevant to the given member. Furthermore, these notifications are conventionally communicated to the given member shortly after the creation of the notification. However, this approach can easily overwhelm the given member and/or the computing device of the given member. As the given member may have hundreds of connections, and each connection engages in activities that results in three or four notifications per day, the online service can easily communicate a substantially number of notifications to the given member. However, this conventional approach is results in wasted computing resources by both the online service and the computing device of the given member, and dissuades the given member from further engaging with the online service.

DESCRIPTION OF THE DRAWINGS

Some embodiments are illustrated by way of example and not limitation in the figures of the accompanying drawings.

DETAILED DESCRIPTION

Figure 1:
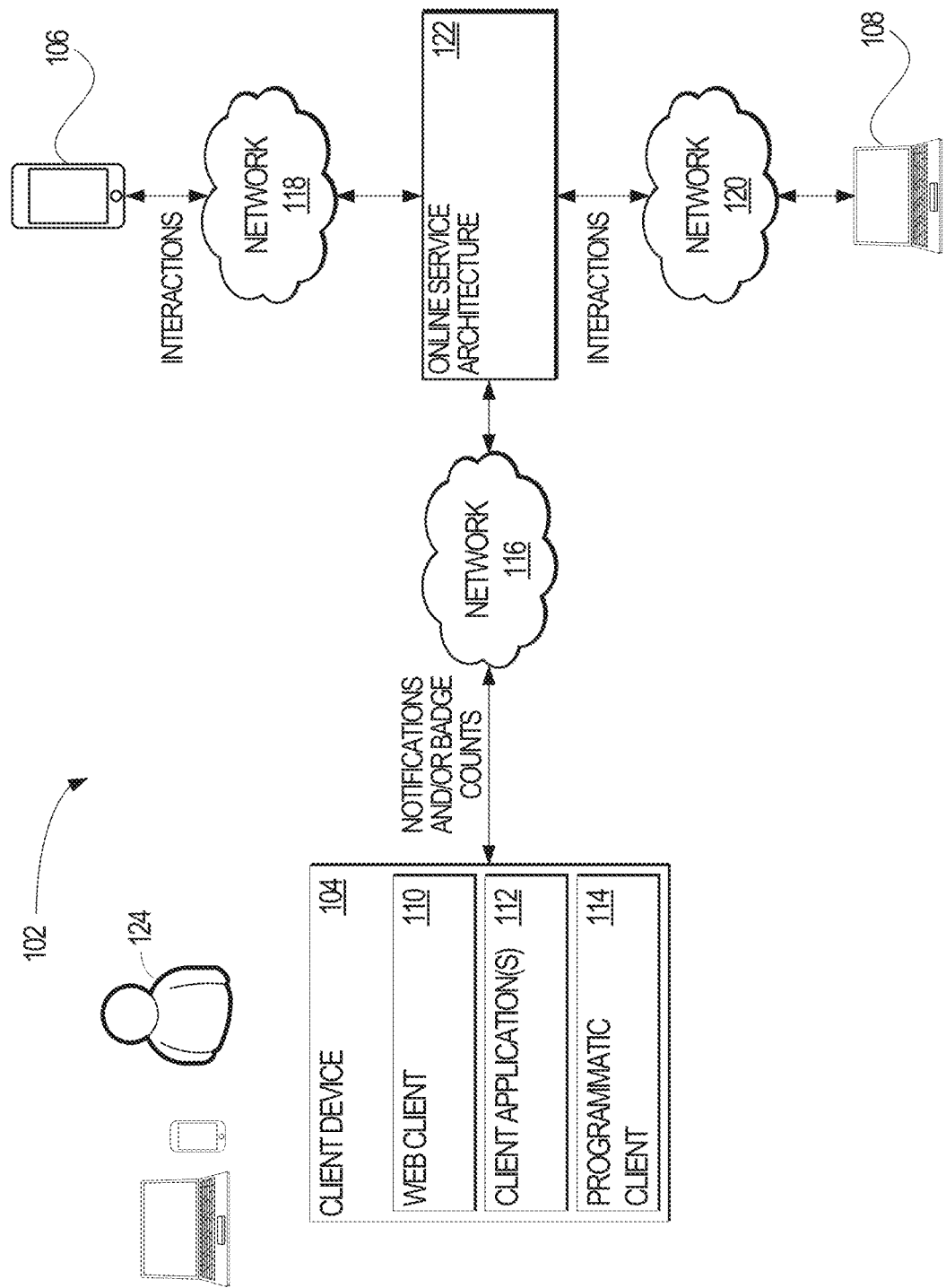
FIG. 1 is a block diagram illustrating a networked system, according to some example embodiments, including a online service architecture.

This disclosure provides for a message spacing system and method that evenly distributes the communication of one or more notifications to a computing device communicatively coupled with an online service. The message spacing system and method also instructs an application residing on the computing device to display a badge notification. The badge notification indicates a number of pending notifications awaiting review by a member of the online service. In one embodiment, the badge notification is overlaid an icon corresponding to an application that the member uses to access or interact with the online service. In another embodiment, the badge notification is overlaid an icon displayed on a webpage, where the icon represents a selectable topic that the member may select to interact with the online service.

The notifications that the messaging spacing system and method may send to one or more members of the online service include offline notifications and online notifications. In this regard, offline notifications refer to those notifications that are based on member profile information and/or activities that are less likely to change (e.g., non-volatile). Examples of the type of information on which offline notifications are based include, but is not limited to, educational history, employment history, memberships in organizations, work anniversaries, birthdays, and other such similar types of information. An offline notification may notify a particular member about a work anniversary that another member (e.g., a first-degree or second-degree connection) has experienced, a birthday that another member is celebrating, a connection with another member that the particular member may want to establish, a job opening that may be of interest to the particular member, and other such types of offline notifications.

In contrast to an offline notification, an online notification refer to hose notifications that are based on member profile information and/or activities that are subject to frequent changes or occur with a relatively frequent, or predetermined, occurrence (e.g., at least once a day). Examples of the type of information on which online notifications are based include, but is not limited to, articles or posts submitted by other members, whether other members of the online service have interacted with a member profile of a particular member (e.g., viewing the member profile of the particular member), whether the member profile of the particular member has appeared in member profile searches performed by other members of the online service, and other such similar types of information. An online notification may notify a particular member about news articles or original postings authored by other members of the online service, whether other members have viewed the member profile of the particular member, whether the member profile of the particular member has appeared in member profile searches performed by other members of the online service, and other such types of online notifications.

Each member of the online service may be associated with one or more offline and/or online notifications at any given time. For example, a single member of the online service may cause, and/or be associated with, three offline notifications and fifteen online notifications. Accordingly, where a member has hundreds of connections (e.g., connections with other members of the online service), it is conceivable that the member could receive hundreds or thousands of notifications (e.g., combinations of offline and/or online notifications) on any given day. Delivering such a high volume of notifications to this member is problematic because there may be notifications that the member may consider important but, because there are so many notifications, the member may not be able to find or identify them.

One conventional approach to address the problem of voluminous notifications is to deliver these notifications to the member at predetermined intervals (e.g., every two minutes, every five minutes, etc.). However, this approach may not be able to deliver all the notifications that the member is scheduled to receive. Furthermore, there may be time-sensitive notifications that are to be delivered to the member and this approach may not adequately deliver the time-sensitive notifications to the member before the activity associated with such notifications expires.

Accordingly, to address these problems, the disclosed message spacing system and method employs various scoring models to score the offline and/or online notifications that are to be delivered to a given member of the online service. Furthermore, the given member of the online service may be associated with a notifications queue of a predetermined size, where the predetermined size determines the number of notifications that the member profile associated with the member can receive or store. The disclosed message spacing system and method may also assign scored and/or ranked notifications to various queues and/or datastores, where these queues and/or datastores may include a queue for notifications that are to be delivered, a queue for notifications that are scheduled for a delayed delivery, and a queue for notifications that are to be discarded (e.g., deleted and the computing resources associated with these notifications made available for other processes, threads, or needs).

One of the technical benefits that the disclosed embodiments provide is the efficient use of available resources, both for the backend architecture that implements one or more of the disclosed embodiments and for the computing device used by the member of the online service. As discussed above, the member of the online service may have hundreds of connections (e.g., another member or organization of the online service), and each of these connections may engage in various activities with the online service. These activities may further result in the online service generating corresponding notifications.

Without a filtration mechanism in place, the online service could, potentially, waste a significant amount of computing resources in sending these hundreds of notifications to the member. Examples of wasted computing resources include storage space, as each notification may be stored in a computer-readable memory for later transmission to the member; processor cycles, as each notification must be handle by a process or thread to be communicated to the member; and, network bandwidth, as each notification uses network bandwidth in being sent to the member. Although taken individually each notification uses a trivial amount of resources, it is in the aggregate (e.g., as the number of notifications increases exponentially) creation of the notifications that notifying a member can present a scalability problem to the online service. Thus, the disclosed embodiments provide a filtration and resource management mechanism that ensure the online service does not unnecessarily waste computing resources in generating and sending notifications to the member.

Furthermore, one or more of the disclosed embodiments provide a technical benefit to the computing device of the member. A computing device, such as a smartphone, typically operates on a portable power supply (e.g., a battery). The computing resources available to the computing device all require use of the battery to function (e.g., without power, the computing device no longer functions). Were the member of the online service to receive unmanaged and unfiltered notifications, the computing device would spend a significant amount of computing resources in the reception, storage, and display of the received notifications. Thus, the disclosed embodiments provide a technical benefit to front-end computing devices as the disclosed embodiments selectively determine which notifications to send to the member's computing device and/or alerts, in the form of badge numbers, which inform the member that he or she was waiting notifications. Finally, as the member of the online service has the potential to receive hundreds of notifications, the member can be easily fatigued or dissuaded from continued use of the online service were he or she to actually receive the hundreds of possible notifications. Thus, from a usability and human engagement standpoint, the disclosed embodiments alleviate engagement fatigue and encourage further interactions with the online service.

This disclosure now turns to the various disclosed embodiments that implement the technical aspects disclosed herein. With reference to FIG. 1, an example embodiment of a high-level client-server-based network architecture 102 is shown. An online service architecture 122 provides server-side functionality via networks 116-120 (e.g., the Internet or wide area network (WAN)) to one or more client devices 104-108. A client device 104 may include different applications and/or modules for interacting with the online service architecture 122. FIG. 1 illustrates, for example, a web client 110 (e.g., a browser, such as the Internet Explorer® browser developed by Microsoft® Corporation of Redmond, Wash. State), client application(s) 112, and a programmatic client 114 executing on client device 104. The online service architecture 122 is further communicatively coupled with other client devices 106-108, which may include similar applications and/or programs as the client device 104.

The client device 104 may comprise, but is not limited to, a mobile phone, desktop computer, laptop, portable digital assistant (PDA), smart phone, tablet, ultra book, netbook, laptop, multi-processor system, microprocessor-based or programmable consumer electronic, or any other communication device that a user 124 may utilize to access the online service architecture 122. In some embodiments, the client device 104 may comprise a display module (not shown) to display information (e.g., in the form of user interfaces). In further embodiments, the client device 104 may comprise one or more of touch screens, accelerometers, gyroscopes, cameras, microphones, global positioning system (GPS) devices, and so forth. The client device 104 may be a device of a user 124 that is used to perform various interactions with the online service architecture 122, such as searching for member profiles, reading articles of interest, communicating with other members, and other such interactions.

In one embodiment, the online service architecture 122 is a network-based appliance that communicates notifications to the client devices 104-108, where one or more of the notifications indicate the interactions and/or activities performed by other members of the online service. One or more users 124 may be a person, a machine, or other means of interacting with the client device 104. In various embodiments, the user 124 is not part of the network architecture 102, but may interact with the network architecture 102 via the client device 104 or another means. For example, one or more portions of the networks 116-120 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device 104 may include one or more applications (also referred to as "apps") such as, but not limited to, a web browser, messaging application, electronic mail (email) application, a social networking access client, and the like. In some embodiments, if the social networking access client is included in the client device 104, then this application is configured to locally provide the user interface and at least some of the functionalities with the application configured to communicate with the online service architecture 122, on an as needed basis, for data and/or processing capabilities not locally available (e.g., access to a member profile, to authenticate a user 124, to identify or locate other connected members, etc.). Conversely if the social networking access client is not included in the client device 104, the client device 104 may use its web browser to access the services provided by the online service architecture 122.

The user 124 may interact with the network architecture 102 via the client device 104 or other means. For instance, the user 124 provides input (e.g., touch screen input or alphanumeric input) to the client device 104 and the input is communicated to the client-server-based network architecture 102 via the network 116. In this instance, the online service architecture 122, in response to receiving the input from the user 124, communicates information to the client device 104 via the network 116 to be presented to the user 124. In this way, the user 124 can interact with the online service architecture 122 using the client device 104.

The user 124 may use the client device 104 to engage in various activities and/or services offered by the online service architecture 122. In addition, the online service architecture 122 is configured to send alerts and/or notifications to the client device 104, such as through the web client 110, the client application(s) 112, and/or the programmatic client 114. Further still, the online service architecture 122 is configured to send notification counts or badge counts to the client device 104, where the badge counts indicate a number of pending notifications that the user 124 has yet to view and/or read. In this context, a notification count or a badge count is a number that may be overlaid on an icon and/or displayed with the icon displayed by the client device 104. The icon may represent an application, such as the client application(s) 112 or the programmatic client 114, or may be a graphic displayed within a webpage displayed by the web client 110. In this manner, the badge count provides an easy way for the user 124 to quickly glance at the client device 104 or the webpage displayed by the web client 110 and see how many pending the notifications the user 124 has. As discussed below with reference to FIG. 2, the badge count reflects the number of pending notifications the user 124 has yet to view, and the online service architecture 122 employs a filtering mechanism for determining which of the notifications are to be displayed, or ready to be displayed, to the user 124.

Further, while the client-server-based network architecture 102 shown in FIG. 1 employs a client-server architecture, the present subject matter is of course not limited to such an architecture, and could equally well find application in a distributed, or peer-to-peer, architecture system, for example.

Where the user 124 has a profile with the online service provided by the online service architecture 122, the user 124 is referred to as a member and the profile as a "member profile." Thus, there may be users of computing devices that access the online service architecture 122 that have not yet created profiles, and there may be users of computing devices that access the online service architecture 122 that are also members. To manage the services provided to the members, the online service architecture 122 may maintain one or more member profile databases storing corresponding member profiles for its members. In general, a member may include an individual person or an organization, such as a company, a corporation, a nonprofit organization, an educational institution, or other such organizations.

Consistent with some embodiments, when a person initially registers to become a member of the social networking service provided by the online service architecture 122, the person is prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on.

Similarly, when a representative of an organization initially registers the organization with the social networking service provided by the online service architecture 122, the representative may be prompted to provide certain information about the organization. With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Members of the social networking service may establish connections with one or more members and/or organizations of the social networking service. The connections may be defined as a social graph, where the member and/or organization is represented by a vertex in the social graph and the edges identify connections between vertices. In this regard, the edges may be bilateral (e.g., two members and/or organizations have agreed to form a connection), unilateral (e.g., one member has agreed to form a connection with another member), or combinations thereof. In this manner, members are said to be first-degree connections where a single edge connects the vertices representing the members; otherwise, members are said to be "nth"-degree connections where "n" is defined as the number of edges separating two vertices. As an example, two members are said to be "2nd-degree" connections where each member shares a connection in common with the other member, but the members are not directly connected to one another.

Although the foregoing discussion refers to "social graph" in the singular, one of ordinary skill in the art will recognize that the online service architecture 122 may be configured to store multiple social graphs. For example, and without limitation, the online service architecture 122 may maintain multiple social graphs, where each social graph corresponds to various geographic regions, industries, members, or combinations thereof.

As a member establishes connections with other members, that member may receive one or more notifications about the members in his or her social graph and/or one or more badge counts that indicate pending notifications. Accordingly, the online service architecture 122 may implement one or more application(s) and/or platform(s) (discussed with reference to FIG. 2) that facilitate these features. In one embodiment, when a member of the social networking service logs in, the client device 104 of the member (e.g., client devices 104-108) may send a message to the online service architecture 122 informing the online service architecture 122 that the member has logged in; in turn, the online service architecture 122 may communicate the notifications and/or badge counts to the client device 104.

Figure 2:
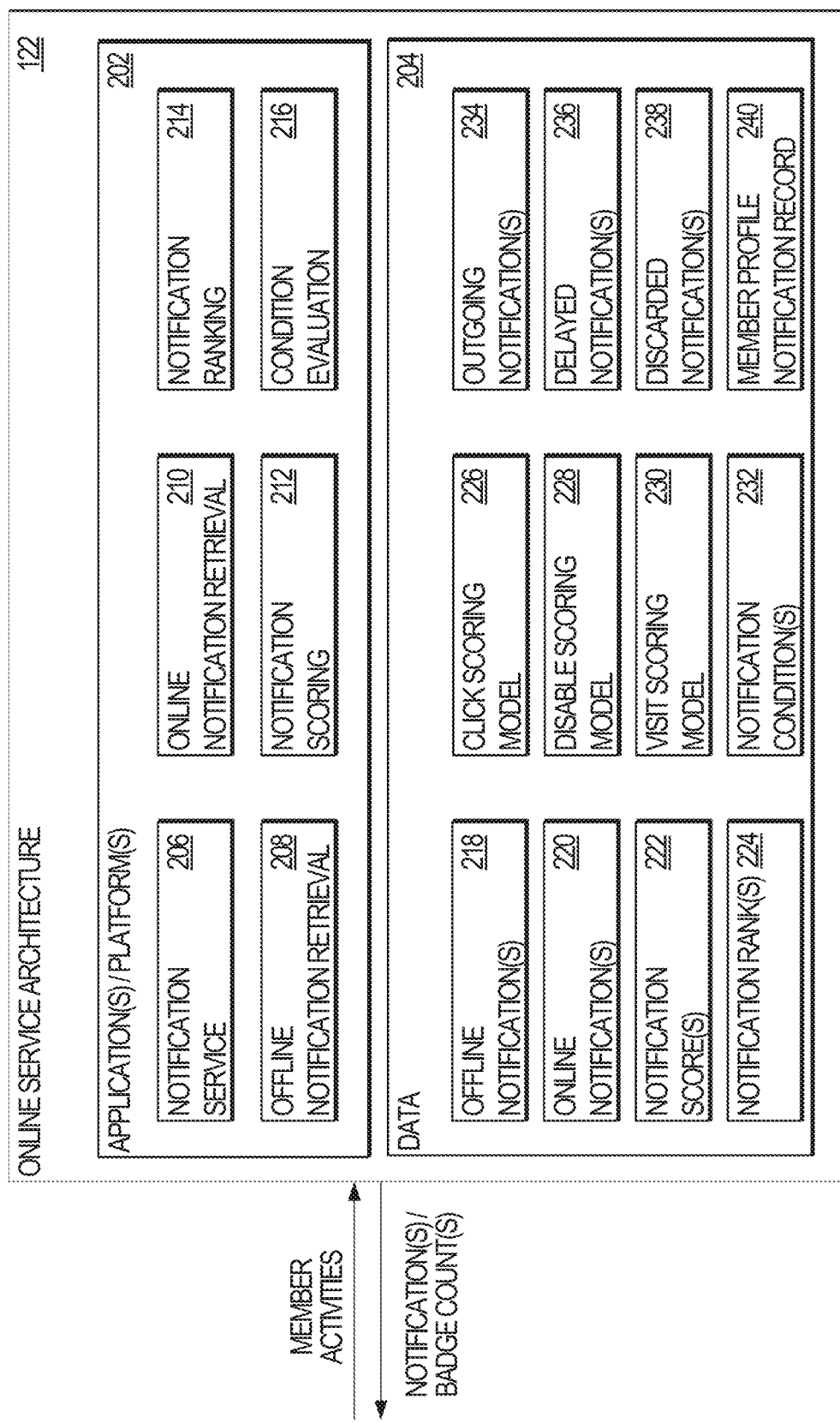
FIG. 2 illustrates the application(s)/platform(s) and data of the online service architecture of FIG. 1, according to an example embodiment.

FIG. 2 illustrates the application(s)/platform(s) and data of the online service architecture of FIG. 1, according to an example embodiment. In one embodiment, the online service architecture 122 includes various application(s) and/or platform(s) 202 to facilitate the distribution of generated notifications and data 204 used to support one or more functionalities of the application(s) and/or platform(s) 202. Although not shown in detail, the online service architecture 122 may also include hardware and/or software components typically implemented in one or more computing devices, such as one or more hardware processors, one or more computer-readable media, one or more communication interfaces, one or more input and/or output devices, and other such components found in a computing device.

The various functional components of the online service architecture 122 may reside on a single device or may be distributed across several computers in various arrangements. The various components of the online service architecture 122 may, furthermore, access one or more databases (e.g., the entity database 222), and each of the various components of the online service architecture 122 may be in communication with one another. Further, while the components of FIG. 2 are discussed in the singular sense, it will be appreciated that in other embodiments multiple instances of the components may be employed.

The processors (not illustrated in FIG. 2) of the online service architecture 122 may be any type of commercially available processor, such as processors available from the Intel Corporation, Advanced Micro Devices, Texas Instruments, or other such processors. Further still, the one or more processors may include one or more special-purpose processors, such as a Field-Programmable Gate Array (FPGA) or an Application Specific Integrated Circuit (ASIC). The one or more processors may also include programmable logic or circuitry that is temporarily configured by software to perform certain operations. Thus, once configured by such software, the one or more processors become specific machines (or specific components of a machine) uniquely tailored to perform the configured functions and are no longer general-purpose processors.

Using various machine-readable media, the online service architecture 122 implements the application(s) and/or platform(s) 202 and stores the data 204. The machine-readable media may include one or more devices configured to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable media" should be taken to include a single medium or multiple media (e.g., a centralized or distributed database, or associated caches and servers) able to store the application(s) and/or platform(s) 202 and the data 204. The term "machine-readable media" may also include one or more machine-readable storage devices. Accordingly, the machine-readable medium may be implemented as a single storage apparatus or device, or, alternatively and/or additionally, as "cloud-based" storage systems or storage networks that include multiple storage apparatus or devices.

In one embodiment, the application(s) and/or platform(s) 202 are written in a computer-programming and/or scripting language. Examples of such languages include, but are not limited to, C, C++, Java, JavaScript, Perl, Python, or any other computer programming and/or scripting language now known or later developed. In this manner, each of the application(s) and/or platform(s) 202 may be implemented in one or more computer-programming and/or scripting language.

With reference to FIG. 2, the application(s) and/or platform(s) 202 of the online service architecture 122 are configured to generate notifications from activities and/or interactions by members of the online service. To perform these and other operations in furtherance of these results, the application(s) and/or platform(s) 202 include, but a notification service 206, an offline notification retrieval application 208 and an online retrieval notification 210. The application(s) and/or platform(s) 202 also include a notification scoring application 212, a notification ranking application 214, and a condition evaluation application 216. While the online service architecture 122 may include alternative and/or additional applications (e.g., a web-hosting platform, a networking application, a printing application, a software-implemented keyboard, etc.), such alternative and/or additional applications are not germane to this disclosure and the discussion of such is hereby omitted for brevity and readability.

The data 204 referenced and used by the application(s) and/or platform(s) 202 include various types of data in support of generating notifications and notifying a member (e.g., via client devices 104-108) that such notifications are available. In this regard, the data 204 includes, but is not limited to, one or more offline notification(s) 218, one or more online notification(s) 220, and various notification score(s) 222 associated with the offline notification(s) 218 and/or online notification(s) 220. The data 204 may further include notification rank(s) 224 that rank the notification(s) 218-220 based on the notification score(s) 222.

The data 204 also includes various scoring models 226-230 for scoring the notification(s) 218-220. In one embodiment, the scoring models 226-230 include a "click" scoring model 226, a "disable" scoring model 228, and a "visit"

scoring model 230. The scoring models 226-230 are each associated with a methodology that scores one or more of the notification(s) 218-220 according to how a member of the online service may react to a notification being scored. In this regard, the click scoring model 226 returns a value that indicates a likelihood that the member may interact with (e.g., click) the notification, the disable scoring model 228 returns a value that indicates a likelihood that the member may disable notifications for the event to which the notification is related, and the visit scoring model 230 returns a value that indicates a likelihood that the member may revisit the online service in response to viewing or interacting with the notification. The scoring models 226-230 are examples of models that may be implemented by the online service architecture 122 and the online service architecture 122 may implement additional and/or alternative models.

The notification condition(s) 232 include one or more condition(s) that indicate when a notification is to be communicated to a member of the online service. The notification condition(s) 232 may be established on a per-member basis such that each member is associated with his or her own set of notification condition(s) 232. When one or more of the notification condition(s) 232 are satisfied, the online service architecture 122 is configured to display a notification and/or update a badge count or notification count associated with a particular member.

The data 204 may also include various queues 234-238 for managing the offline notification(s) 218 and/or online notification(s) 220. In one embodiment, the queues 234-238 include an outgoing notification(s) 234 for notification(s) 218-220 that are intended for display to a particular member, a delayed notification(s) queue 236 for notification(s) 218-220 that are a lesser priority than the notification(s) 218-220 assigned to the outgoing notification(s) 234 but are still intended to be displayed to a particular member, and a discarded notification(s) queue 238 for notification(s) 218-220 that are not going to be displayed and/or communicated to the particular member. Although the online service architecture 122 may simply delete those notification(s) 218-220 that are not going to be displayed to a particular member, the online service architecture 122 may implement the discarded notification(s) queue 238 to analyze the discarded notification(s) 218-220 for one or more characteristics and/or attributes.

Finally, the data 204 may also include a member profile notification record 240 that stores and/or provides information about the notification(s) that a particular member has previously received and/or interacted with. The member profile notification record 240 may further include information about the notification(s) that the particular member will receive (e.g., obtained from the outgoing notification(s) queue 234 and/or the delayed notification(s) queue 236). Examples of the type of information that the member profile notification record 240 may include are the type of notification that was sent (e.g., a notification about a work anniversary, a notification about a birthday, a notification about another member that may be relevant to the member's social graph, a notification about a potential job opening that may be relevant to the member, etc.), the date and/or time when the notification was sent, the type of interaction that the member performed in response to the notification (e.g., whether the member selected the notification, whether the member viewed the notification, whether the member disabled notifications for the notification type, etc.), the job, member, and/or organization that the notification was about, and other such types of information. In summary, the member profile notification record 240 provides a comprehensive record of the notifications, both previously sent and those awaiting disposition by the member, associated with particular member and/or the member's member profile.

Some of the challenges in evenly distributing the delivery of notifications to a member of the online service are both technical and service oriented. If the online service architecture 122 delivers notifications to a member too frequently, the online service architecture 122 expends unnecessary resources and the member becomes disillusioned or discouraged from continued use of the online service. If the online service architecture 122 delivers the notification too infrequently, then the online service architecture 122 has an overabundance of resources that could be meaningfully spent, and the member may become frustrated or unhappy with the level of service provided by the online service. Thus, a challenge can be found in optimizing the delivery of notifications to the member.

To frame this problem, the online service architecture 122 may define the delivery of notifications in mathematical terms, for example, by the following equation:

$$[\{S(X)\}]_m \otimes m(I(T))]_{k \to m} \quad \text{(eq. 1)}$$

where:

m is a member of the online service;

X includes one or more features for a scoring model used to score a particular notification;

T includes one or more conditions that, when satisfied, signal to send one or more notifications to the member m;

S(X) is a score for a particular notification determined according to one or more scoring models;

m(I(T)) is a function that if T is one or more conditions having been satisfied, then I(T)=1, which instructs the online service architecture 122 delivers one or more notifications to the member m;

$\{S(X)\}_m$ is a set of notifications with associated scores for the member m;

$[\ ]_{k \to m}$ are the application(s) and/or platforms(s) 202 that select k notifications to send to the member m;

a⊗b is a function such that if b=1 or not empty, then all of a is kept. If b=0, then all of a is removed.

To determine score for a particular notification, the online service architecture 122 may reference the click scoring model 226, the disable scoring model 228, and/or the visit scoring model 230. An example of the scoring function S(X) is provided below as equation two.

$$S(X)=(\alpha \times p\text{Click}(X))+(\beta \times p\text{Disable}(X))+(\gamma \times p\text{Visit}(X)) \quad \text{(eq. 2)}$$

where, pClick corresponds to the click scoring model 226;

pDisable corresponds to the disable scoring model 228;

pVisit corresponds to the visit scoring model 230;

α is a constant value associated with the click scoring model 226;

β is a constant value associated with the disable scoring model 228, and

γ is a constant value associated with the visit scoring model 230.

In one embodiment, the notification scoring application 212 is configured to implement the function of equation 2. Furthermore, each of the constant values α, β, and γ may be established by an administrator or other authorized personnel of the online service architecture 122. Additionally and/or alternatively, each of the constant values α, β, and γ may be empirically determined through successive iterations of one or more of the models 226-230. In addition, the click scoring model 226, the disable scoring model 228, and/or the visit scoring model 230 may be implemented as one or more different types of statistical models including, but not limited to, a time series model, a linear regression model, a logistic model, or other such models or combinations thereof. The scoring models 226-230 may also be implemented as machine-learning models, where each model has been trained using one or more notification types and interactions with those notification types as training data. As shown above with reference to eq. 2, the constant values have the effect of changing the relative importance of the values returned by any one of the scoring models 226-230.

The notification scoring application 212 provides a technical benefit to the disclosed online service architecture 122 because it allows the online service architecture 122 to filter out those notifications 218-220 that are not to be sent to a particular member or to delay particular notifications for later delivery. These features reduce the amount of resources utilized by the online service architecture 122 and increase its overall efficiency with respect to delivering notifications to corresponding members.

The features X may include one or more offline and/or online features. In general, offline features include those features that are less likely to change over time or change infrequently relative to other features. An offline feature may further include those features that change or are modified in response to modifications to a member profile that are made by the member of the online service. Examples of offline features include a level of completeness of a particular member profile, the number of connections associated with the member profile, the number of schools attended by the member, whether the member is an employment recruiter, and other such offline features. Similarly, online features include those features that are more likely to change over time or change frequently relative to other features. Furthermore, an online feature may be those features that change or are modified in response to interactions with notifications by the member of the online service. Examples of online features include the number of sessions (e.g., logins) that a member has conducted with the online service, the badge count for pending notifications associated with a member profile, the number of notifications that a member has interacted with during his or her previous session, the amount of time that has elapsed since the badge count was last updated for the member profile, and other such online features or combinations thereof.

Figure 3:
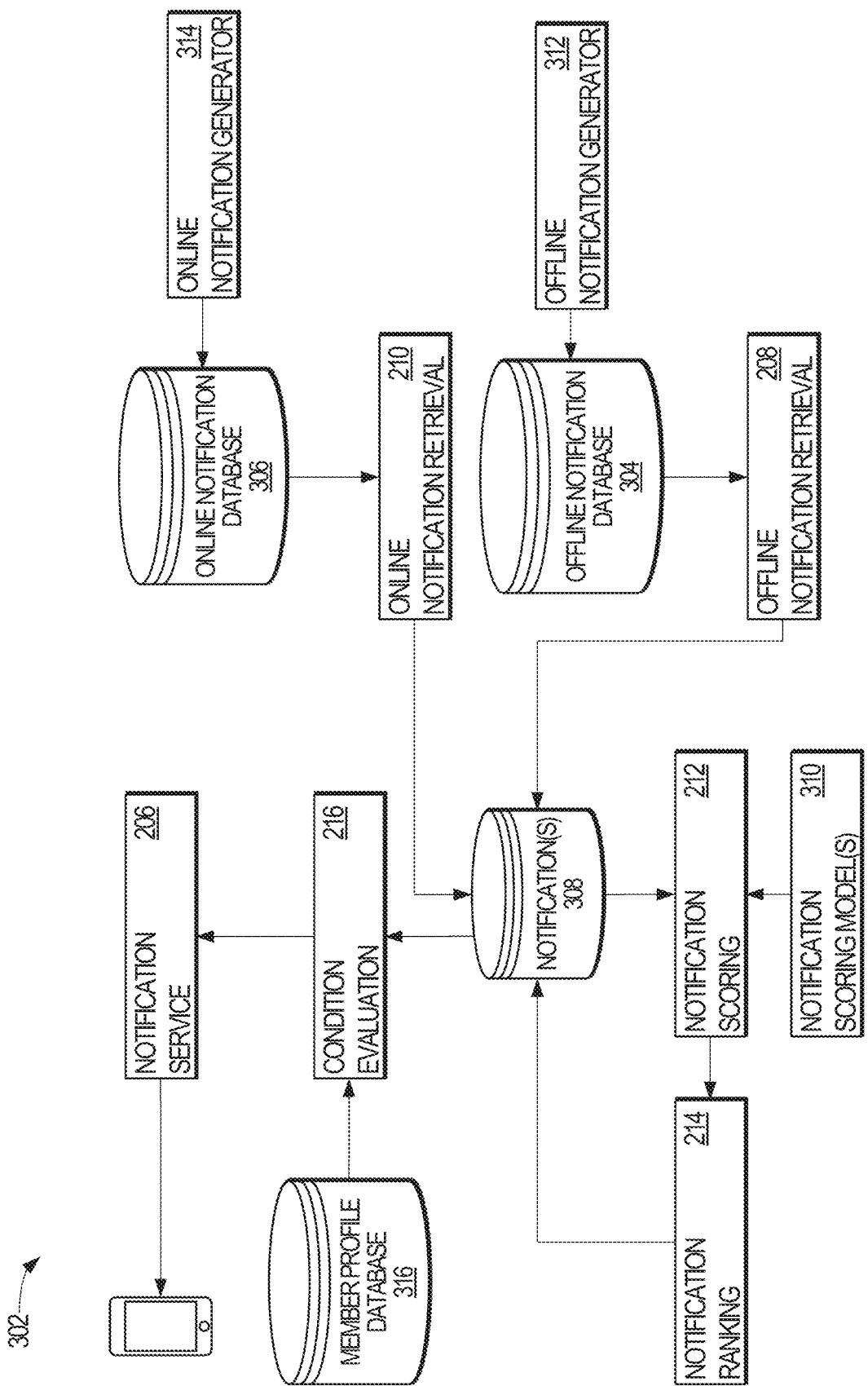
FIG. 3 illustrates a processing diagram, in accordance with an example embodiment, of the various application(s) and/or platform(s), shown in FIG. 2, implementing a message spacing algorithm as disclosed herein.

FIG. 3 illustrates a processing diagram 302, in accordance with an example embodiment, of the various application(s) and/or platform(s) 202, shown in FIG. 2, implementing a message spacing algorithm as disclosed herein.

In one embodiment, the online service architecture 122 includes an online notification generator 314 and an offline notification generator 312. As used herein, an online notification is a notification that is generated in real-time, and/or in near real-time, relative to a particular member activity (or interaction) and is associated with a particular set of volatile metrics and/or measurements. These metrics and/or measurements are volatile because they frequently change or subject to frequent changes. Examples of such metrics and/or measurements include the last time a member accessed the online service architecture 122, whether a member is currently online with the online service, the last time a member updated his or her member profile, whether a member has posted an item of interest (e.g., a comment, news article, opinion article or other writing, etc.), whether a member has been mentioned in an item of interest, and other such metrics and/or measurements. The online notification generator 314 may generate these one or more online notifications by referencing one or more databases of the online service architecture 122, such as a member profile database 316 that stores one or more member profiles of members of the online service, and retrieving one or more member profiles that are connected within a particular member's social graph. The online notification generator 314 may then evaluate one or more conditions and/or rules (not shown) using one or more member profile attribute values to determine whether to generate a particular online notification.

Furthermore, as the online notification generator 314 generates the online notifications, the online notification generator 314 may populate an online notification database 306 communicatively coupled with the online notification generator 314. As discussed below, one or more of the other application(s) and/or platform(s) of the online service architecture 122 may then retrieve the generated online notifications from the online notification database 306.

Similarly, the online service architecture 122 may also include an offline notification generator 312 configured to generate one or more offline notifications. As used herein, an offline notification is a notification that is generated according to a predetermined schedule and/or time intervals and is associated with a set of non-volatile metrics and/or measurements. For example, an offline notification may be generated daily, weekly, monthly, and so forth. These metrics and/or measurements are non-volatile because they do not change as frequently as the metrics and/or measurements associated with the online notifications. Examples of such metrics and/or measurements include anniversary dates a work anniversary), birthdays, member connection suggestions, job opportunity recommendations, and other such metrics and/or measurements. Like the online notification generator 314, the offline notification generator 312 may generate these one or more offline notifications by referencing one or more databases of the online service architecture 122, such as the member profile database 316 and retrieving one or more member profiles that are connected within a particular member's social graph. The offline notification generator 316 may then evaluate one or more conditions and/or rules (not shown) using one or more member profile attribute values to determine whether to generate a particular offline notification.

Furthermore, as the offline notification generator 312 generates the offline notifications, the offline notification generator 312 may populate an offline notification database 304 communicatively coupled with the offline notification generator 312. As discussed below, one or more of the other application(s) and/or platform(s) of the online service architecture 122 may then retrieve the generated offline notifications from the offline notification database 304.

To retrieve the online notifications and/or offline notifications, the online service architecture 122 may execute the online notification retrieval application 210 and/or the offline notification retrieval application 208. In one embodiment, the online notification retrieval application 210 and/or the offline notification retrieval 208 are implemented using one or more database access libraries and/or programming interfaces, such as the Java Database Connectivity (JDBC) API or Apache Hive™. The online notification retrieval application 210 and/or the offline notification retrieval application 208 each retrieve notifications from the databases 304-306, which are then merged into a unitary database and/or notification queue 308.

As the offline notification(s) 218 and/or online notification(s) 220 are populated into the notification queue 308, the notification scoring application 212 scores each of the notifications using one or more of the notification scoring model(s) 310. In one embodiment, the notification scoring application 212 initially scores the notifications of the notification queue 308 according to the scoring function provided in equation 2. The notification scoring application 212 may be configured to score the offline notification(s) 218 and/or online notification(s) 220 at one or times prior to the delivery of the notification to the designated member. The notification scoring application 212 may score the notification(s) 218-220 at different times because one or more of the features associated with the notification(s) 218-220, such as the online features, are volatile and may change while a given notification is pending delivery in the notification queue 308.

In one embodiment, the notification scoring application 212 initially scores a notification when it is placed into the notification queue 308 (e.g., by the offline notification retrieval application 208 or the online notification retrieval application 210). In initially scoring the notification, the notification scoring application 212 may use one or more offline features as parameters to the scoring models 226-230. As discussed below, during a second pass scoring of the notification, the notification scoring application 212 may use one or more online features as parameters to the scoring models 226-230. In alternative embodiments, a combination of offline and online features are used as parameters to the scoring models 226-230. The scores assigned by the notification scoring application 212 may be stored as the notification score(s) 222.

Following the initial scoring of a notification, the score assigned to the notification may be compared against one or more thresholds to determine whether the notification remains in the notification queue 308. For example, the online service architecture 122 may establish a first threshold that indicates whether the notification is to be discarded and a second threshold that indicates whether the notification is to be delayed. Where the notification score assigned to the notification is below the first threshold, the online service architecture 122 may then discard the notification (e.g., delete the notification) or mark the notification for deletion. Notifications that are marked for deletion or marked as not to be delivered, may be stored as the discarded notification(s) 238. The online service architecture 122 may retain those notifications that are not to be delivered for later study and/or evaluation.

The remaining notifications may then be ranked by the notification ranking application 214. The notification ranking application 214 is configured to rank the remaining notifications so that the online service architecture 122 knows which of the notifications are to be identified as those for immediate delivery and those for delayed delivery. In one embodiment, the notification ranking application 214 ranks each of the notifications regardless of whether each notification has been scored twice; in another embodiment, the notification ranking application 214 ranks only those notifications that have been scored twice.

Accordingly, the online service architecture 122 may implement the second threshold as a rank-based threshold or a score-based threshold. Where the notification rank and/or notification score assigned to the notification is below the second threshold, the online service architecture 122 may identify the notification as a delayed notification 236. A delayed notification includes those notifications that are to be delivered to the member, but at a later time after outgoing notification(s) 234 have been delivered to the member. Similarly, where the notification rank and/or notification score assigned to the notification is at or above the second threshold, the online service architecture 122 may identify the notification as an outgoing notification(s) 234. In one embodiment, the online service architecture 122 selects a predetermined number of notifications from the delayed notification(s) 236 to be outgoing notification(s) 234 after a predetermined number of one or more of the outgoing notification(s) 234 have been sent. For example, the online service architecture 122 may select the top two notifications from the delayed notification(s) 236 to be sent after sending five notifications from the outgoing notification(s) 234.

As notifications are pending for delivery to a member, the condition evaluation application 216 is continuously evaluating one or more notification condition(s) 232 that indicate when a notification is to be delivered to a member. In one embodiment, the notification condition(s) 232 comprise one or more rules, and the condition evaluation application 216 evaluates the rules to determine whether to send a notification from the outgoing notification(s) 234. For example, one notification condition may be that a given member has received less than five notifications of a "work anniversary" type. If the condition evaluation application 216 evaluates this condition as true, the notification service 206 may then select one or more notifications from the outgoing notification(s) 234 that are of the "work anniversary" type to be delivered to the member.

To evaluate the one or more notification condition(s) 232, the condition evaluation application 216 may reference a member profile database 316 and retrieve one or more member profile notification records 240. As discussed above, a member profile notification record 240 may include one or more member profile notification record attributes such as the types of notifications that have been sent (e.g., a notification about a work anniversary, a notification about a birthday, a notification about another member that may be relevant to the member's social graph, a notification about a potential job opening that may be relevant to the member, etc.), the date and/or time when the notifications were sent, the type of interactions that the member performed in response to a particular notification (e.g., whether the member selected the notification, whether the member viewed the notification, whether the member disabled notifications for the notification type, etc.), the job, member, and/or organization that the notification was about, and other such attributes. One or more of these attributes may be used by the condition evaluation application 216 to evaluate one or more of the notification condition(s) 232.

In one embodiment, when one or more conditions of the notification condition(s) 232 are evaluated as true, the notification scoring 212 conducts a second pass scoring on one or more notifications of the outgoing notification(s) 234 and/or the delayed notification(s) 236. In this second pass scoring, the notification scoring 212 may leverage one or more online features to evaluate the pending notifications 234-236. This second pass scoring is technically beneficial because it ensures that the online service architecture 122 is optimally using the computing resources available to the online service architecture 122.

The notification service 206 is configured to deliver and/or display one or more notifications from the outgoing notification(s) 234 and/or delayed notification(s) 236 to a corresponding member. In one embodiment, the notifications 234-236 are delivered within a web page or other browser-based application that a member uses to access the online service architecture 122. In another embodiment, the notifications 234-236 are delivered to a client application 112 being executed by the client device 104 and displayed within the client application 112 or within another portion of the client device 104. Further still, the notification service 206 may maintain a count of the outgoing notification(s) 234 and/or delayed notification(s) 236 and communicate this count as a badge count to the client device 104. Like the notifications themselves, the badge count may appear within a web page displayed by the client device 104 and/or overlaid with an icon representing a client application 112 that the member uses to access the online service architecture 122.

Figure 4:
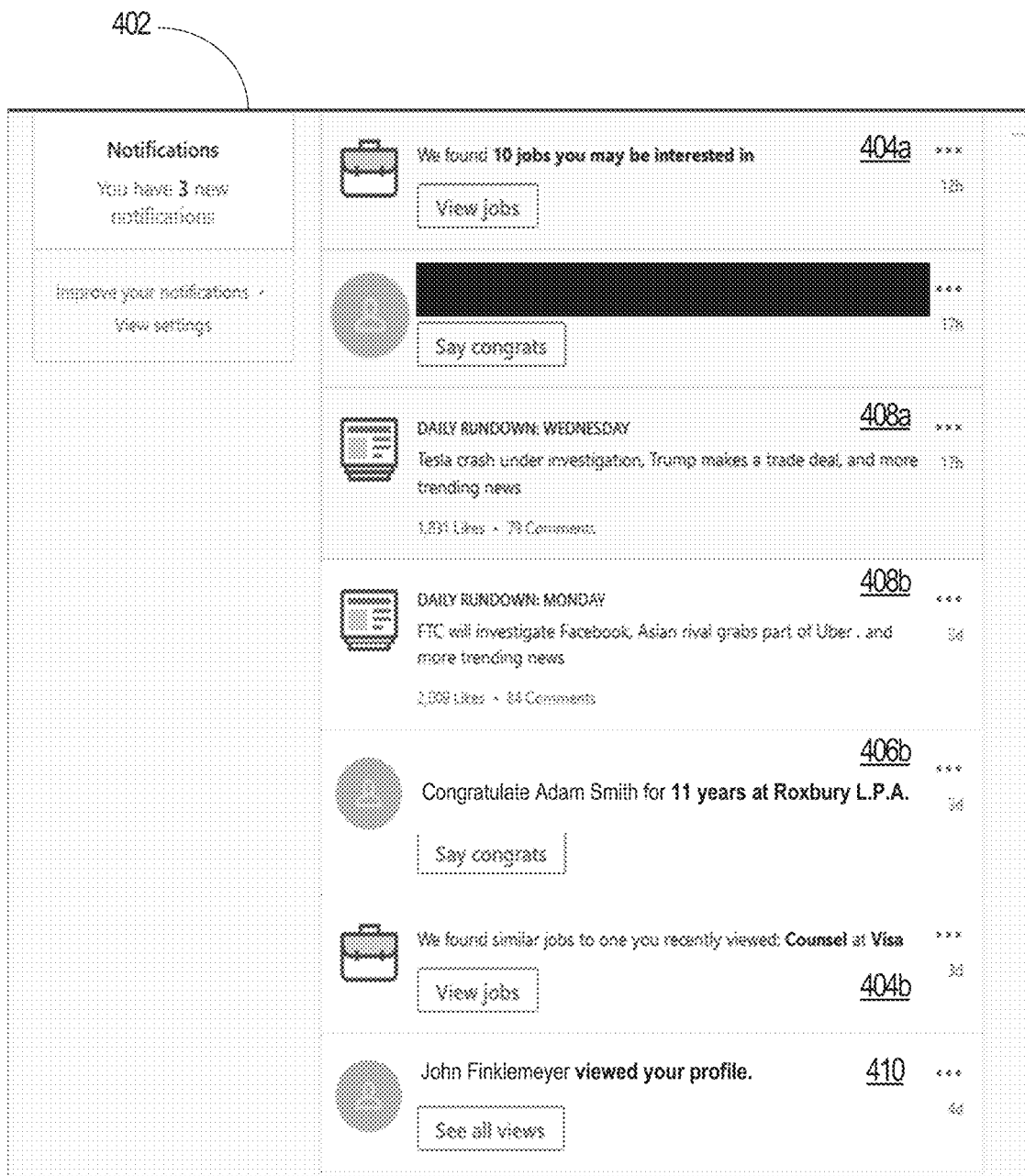
FIG. 4 illustrates the various types of notifications that a member of the online service may receive, according to an example embodiment.

FIG. 4 illustrates the various types of notifications 404a-410 that a member of the online service may receive, according to an example embodiment. FIG. 4 illustrates that the notifications 404a-410 may appear on a graphical user interface 402 that a member may use to interact with the online service. In one embodiment, the graphical user interface 402 is a web page. In another embodiment, the graphical user interface 402 is a screen displayed by an application being executed by the client device 104.

The notifications 404a-410 displayed by the graphical user interface 402 include various types of notifications. As example, the notifications may include job type notifications 404a-404b, work anniversary type notifications 406-406b, news type (or item of interest type) notifications 408a-408b, and profile view type notifications 410. The notifications 404a-410 shown in FIG. 4 are merely illustrative and the online service architecture 122 may be configured to implement additional and/or alternative types of notifications.

Figure 5A:
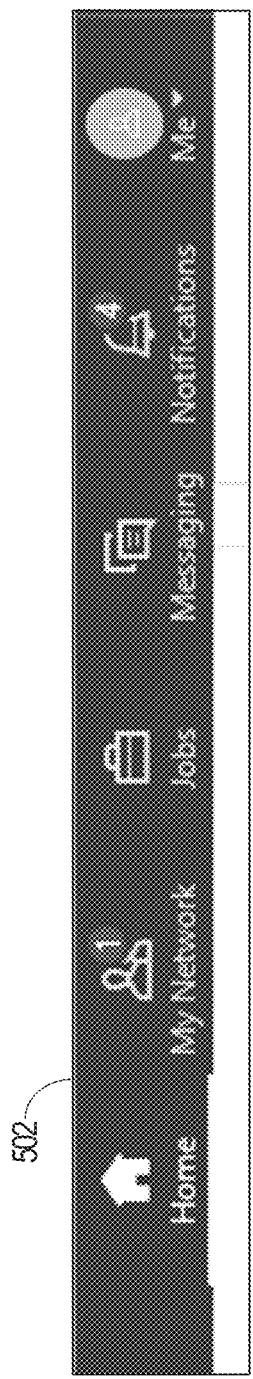
FIGS. 5A-5B illustrate badge notifications that are displayed to a member of the online service, according to an example embodiment.
Figure 5B:
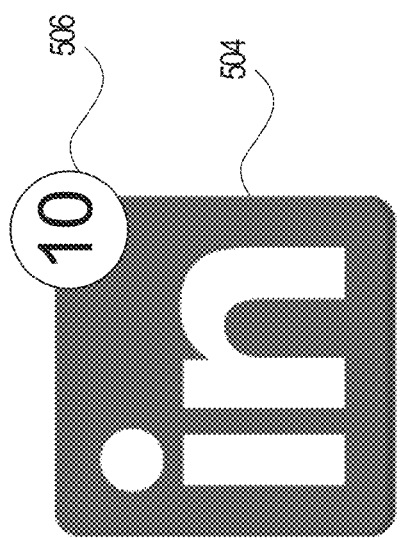

FIGS. 5A-5B illustrate badge notifications that are displayed to a member of the online service, according to an example embodiment. FIG. 5A illustrates a graphical user interface 502 where the badge counts are displayed over web page elements, namely graphics, displayed by a web page. In the example shown in FIG. 5A, the badge counts indicate that there is one pending notification for a "My Network" category and four pending notifications within a "Notification" category. As one of ordinary skill in the art will understand, as a member views and/or interacts with a notification, the online service architecture 122 decrements the corresponding badge count.

FIG. 5B illustrates an example of a graphic icon 504 representing an application used to interact with the online service, according to an example embodiment. As shown in FIG. 5B, the graphic icon 504 includes a badge count 506 of ten, indicating that there are ten pending notifications waiting for the member to view. As with the badge counts illustrated in FIG. 5A, as the member interacts and/or views the pending notifications, the online service architecture 122 decrements the badge count 506. In additional and/or alternative embodiments, the member may instruct the online service architecture 122 to dismiss the pending notifications and/or to reset the badge count 506.

Figure 6A:
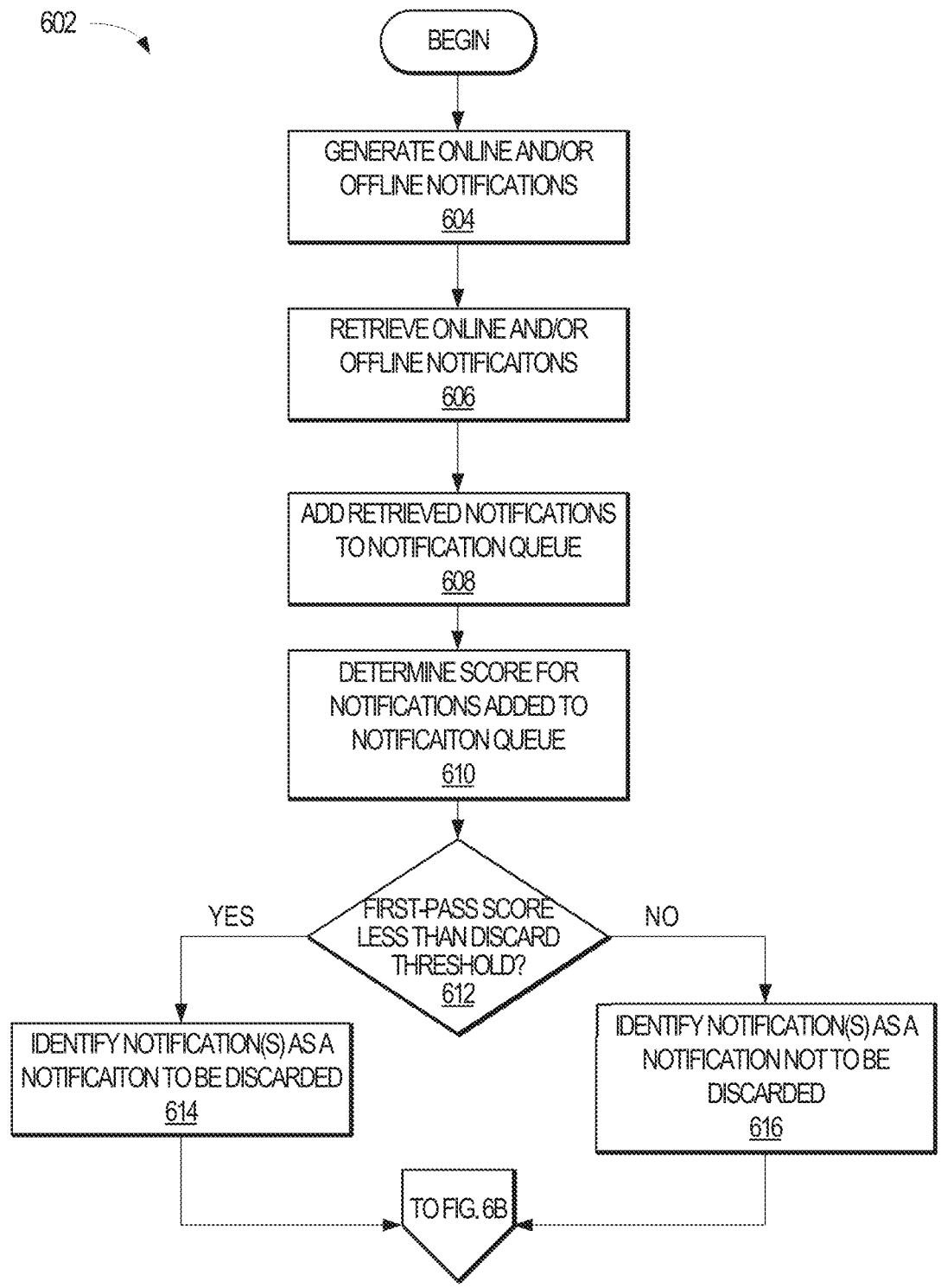
FIGS. 6A-6C illustrate a method, in accordance with an example embodiment, for communicating notifications to a member of an online service.
Figure 6B:
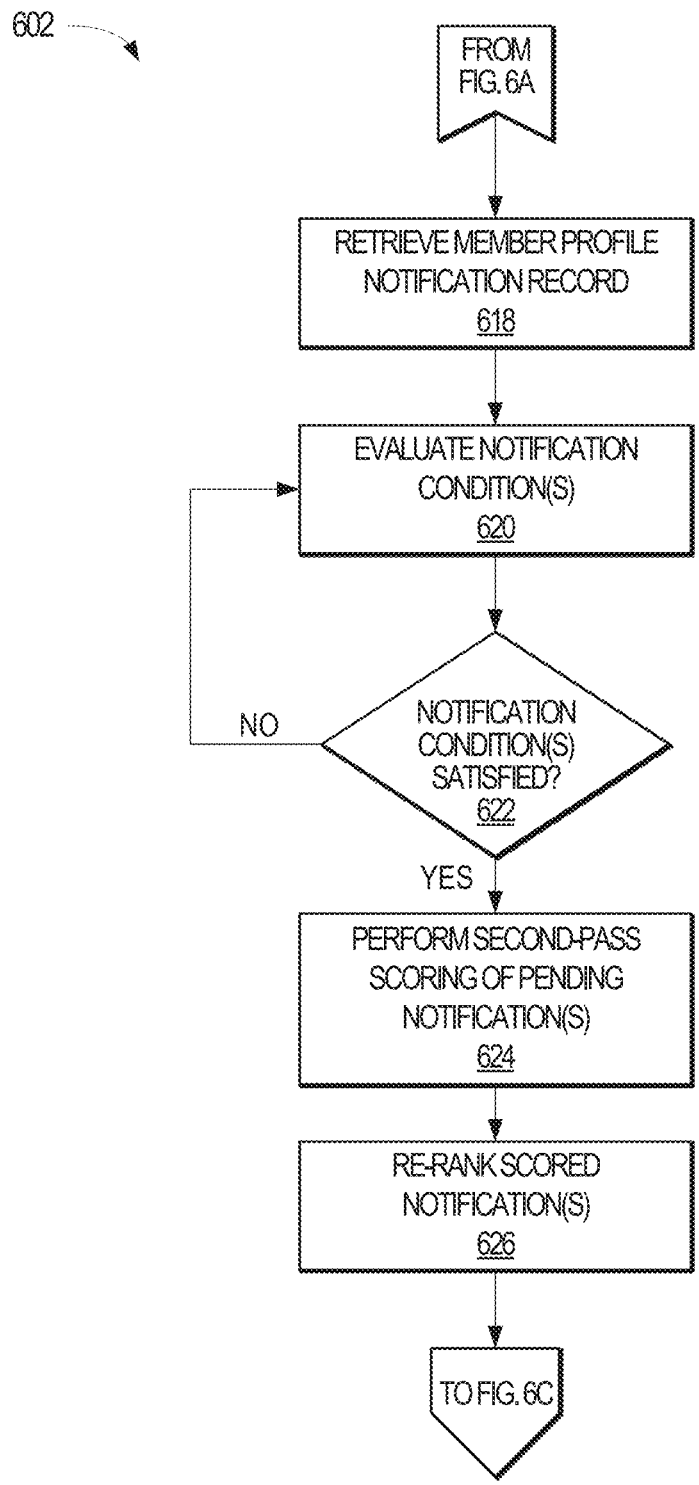
Figure 6C:
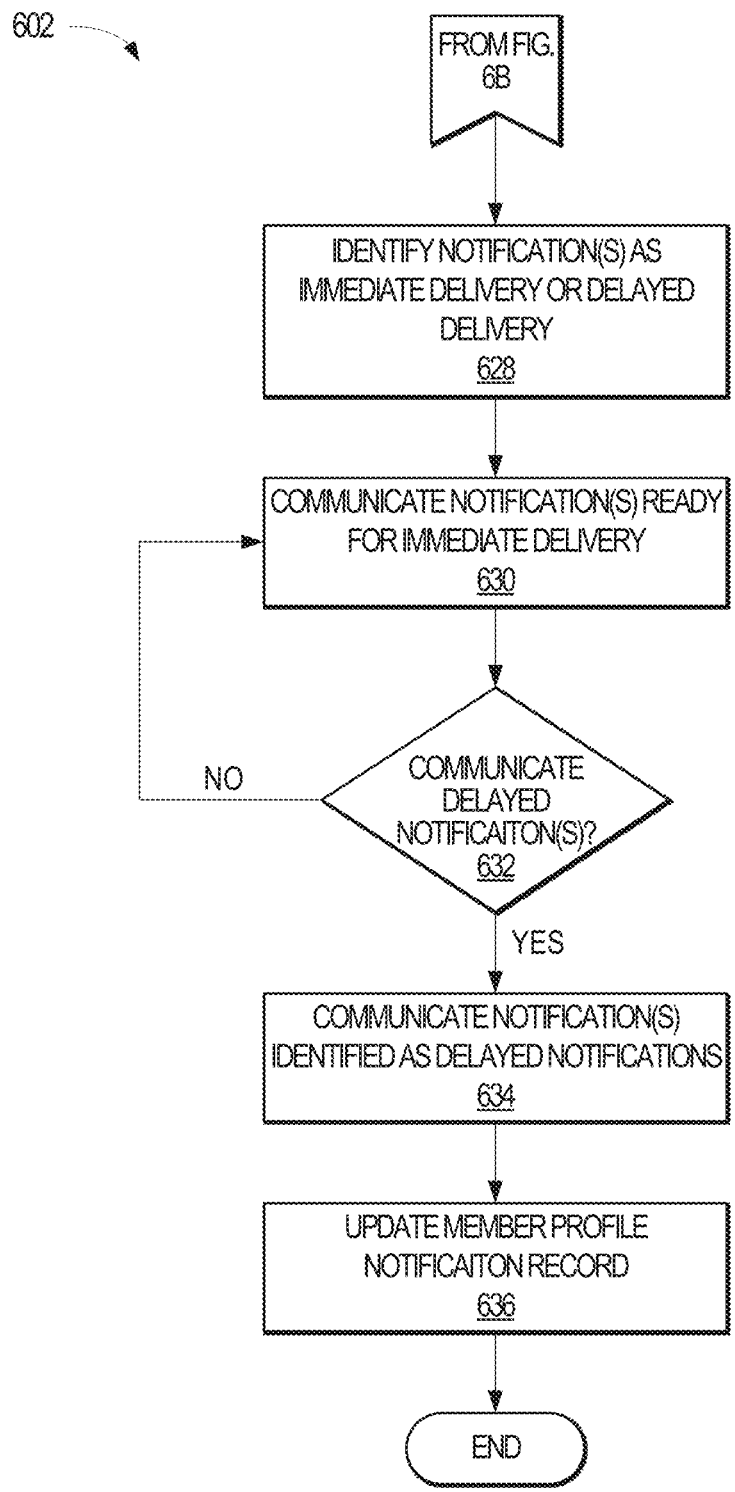

FIGS. 6A-6C illustrate a method 602, in accordance with an example embodiment, for communicating notifications to a member of an online service. The method 602 may be implemented by one or more components illustrated in FIGS. 2-3, and is discussed by way of reference thereto.

Referring initially to FIG. 6A, the online notification generator 314 and/or the offline notification generator 316 generate one or more offline and/or online notifications (Operation 604). The online notification generator 314 and the offline notification generator 316 each populate their respective databases 304-306.

Upon a predetermined condition being met, such as a predetermined time interval having expired or detecting that a new notification has been added to the database, the online notification retrieval application 210 and the offline notification retrieval application 208 each retrieve their respective notifications (Operation 606). The online notification retrieval application 210 and the offline notification retrieval application 208 then add their respective notification(s) 218-220 to the notification queue 308 (Operation 608)

As the notification(s) 218-220 populate the notification queue 308, the notification scoring application 212 is configured to score each of the notifications using one or more notification scoring models 310. In one embodiment, the notification scoring models 310 include the click scoring model 226, the disable scoring model 228, and the visit scoring model 230. The notification scoring application 212 determines a notification score the notifications 218-220 in the notification queue 308, and stores these scores as the notification score(s) 222 (Operation 610). These initially determined scores may be considered as first-pass scores for each of the notifications 218-220 that are scored.

The notification scoring application 212 may then compare the first-pass scores (e.g., the notification score(s) 222) with a predetermined threshold to determine whether the online service architecture 122 should discard a corresponding notification (Operation 612). The notification scoring application 212 determines that the first-pass score is less than a predetermined threshold (e.g., the "YES" branch of Operation 612), the notification scoring application 212 identifies the notification as one to be discarded (e.g., identified as a discarded notification 238). Where the notification scoring application 212 determines that the first-pass score is greater than (or equal to) the predetermined threshold (e.g., the "NO" branch of Operation 612), the notification scoring application 212 identifies the notification as one not to be discarded (Operation 616).

Referring next to FIG. 6B, during these operations (or any other operation), the condition evaluation application 216 is evaluating one or more of the notification condition(s) 232 to determine whether a member of the online service is to receive one or more of the retrieved notification(s) 218-220. As explained above, the condition evaluation application 216 may retrieve one or more member profile notification record(s) 240 to use in evaluating the one or more notification condition(s) 232 (Operation 618).

The condition evaluation application 216 then evaluates one or more notification condition(s) 232 using one or more of the member profile notification record attributes (Operation 622). For example, the condition evaluation application 216 may evaluate whether to send a notification to a member based on the last time a notification was sent, whether to send a specific type of notification based on the last type of notification sent or the number of notifications sent of the corresponding type, whether to send more than one notification, and other such conditions. Where a notification condition is not satisfied and/or a predetermined number of notification conditions are not satisfied (e.g., the "NO" branch of Operation 622), the method 602 returns to Operation 620 or any of the other prior operations.

Where a notification condition is satisfied and/or a predetermined number of notification conditions are satisfied (e.g., the "YES" branch of Operation 622), the condition evaluation application 216 instructs the notification scoring application 212 to perform a second-pass scoring of the pending notification(s) (e.g., notifications not identified as discarded notification(s) 238) (Operation 624). In one embodiment, the notification scoring application 212 scores the pending notifications using one or more online features as parameters for one or more of the scoring models 310. In one embodiment, the notification scoring application 212 then replaces the first-pass scores of the pending notifications with their corresponding second-pass scores. In an additional and/or alternative embodiment, the notification scoring application 212 determines the second-pass scores using both one or more offline features and one or more online features. In this manner, the second-pass scores for the pending notifications become the notification score(s) 222.

Having re-scored the pending notifications, the notification scoring application 212 instructs the notification ranking application 214 to rank one or more of the re-scored notifications (Operation 626). Referring to FIG. 6C, the notification ranking application 214 and/or the notification scoring application 212 then determines which of the pending notifications are to be identified as outgoing notification(s) 234 (e.g., notifications for immediate delivery) and those notifications that are to be sent later (e.g., as delayed notification(s) 236) (Operation 628). In one embodiment, the pending notifications are identified as outgoing notification(s) 234 or delayed notification(s) 236 according to their assigned ranks. For example, the online service architecture 122 may be configured to define that the top 10 notifications or the top 10% of notifications are to be identified as outgoing notification(s) 234 and that remaining notifications are to be identified as delayed notification(s) 236. In another embodiment, the pending notifications are identified as outgoing notification(s) 234 or delayed notification(s) 236 according to their assigned scores. For example, the online service architecture 122 may define that notifications having a predefined second-pass score value at or above a defined threshold are to be defined as outgoing notification(s) 234.

The notification service 206 then communicates one or more of the outgoing notification(s) 234 to a corresponding member of the online service (Operation 630). For example, a notification may include one or more notification attributes that identify one or more members to which the notification should be sent. In one embodiment, the notification service 206 communicates an outgoing notification to a member when the member logs into the online service architecture 122 (e.g., via the web client 110). In another embodiment, a member may opt to receive notifications via a programmatic client 114 that executes as a background process on the client device 104, and the notification service 206 communicates the outgoing notification(s) 234 to the programmatic client 114.

Having communicated the outgoing notification(s) 234, the online service architecture 122 then determines whether to communicate one or more of the delayed notification(s) 236 (Operation 632). In one embodiment, the online service architecture 122 determines whether to communicate one or more of the delayed notification(s) 236 by executing the condition evaluation application 216 and evaluating one or more of the notification condition(s) 232. For example, a notification condition may specify "Send three Work Anniversary type notifications in two hours," and the condition evaluation application 216 may determine that only two Work Anniversary type notifications have been sent in the last two hours (e.g., by referencing one or more member profile notification record attributes). In this example, where a Work Anniversary type notification is pending in the delayed notification(s) 236 and there are no Work Anniversary type notifications pending as outgoing notification(s) 234, the condition evaluation application 216 may instruct the notification service 206 to send the Work Anniversary type notification from the delayed notification(s) 236. The foregoing example is merely illustrative, and one of ordinary skill in the art will understand how other notification condition(s) 232 may be constructed and/or defined to support other types of notifications and/or to define the circumstances under which a notification is sent from the delayed notification(s) 236.

Accordingly, where one or more notification condition(s) 232 are evaluated in the affirmative (e.g., the "YES" branch of Operation 632), the notification service 206 communicates one or more pending notifications identified as delayed notification(s) 236 (Operation 634). Additionally and/or alternatively, where one or more notification condition(s) 232 are evaluated in the negative (e.g., the "NO" branch of Operation 632), the method 602 returns to Operation 630 (or any other prior operation). The notification service 206 then updates one or more member profile notification records 240 corresponding to members that were sent the notifications (Operation 636). In one embodiment, updating a member profile notification record includes, but is not limited, adding information about the type(s) of notification(s) that were sent, the time(s) that the notification(s) were sent, the subject matter (e.g., the member or item of interest) identified in the notification(s), how the member responded to the notification(s) (e.g., whether the member viewed or interacted with the notification), and other such types of information.

In this manner, the disclosed systems and methods provide a mechanism for efficiently using the computing resources available to the online service architecture 122 and ensuring that pending notifications are delivered to members of the online service in a manageable manner. Rather than sending any and/or all pending notifications to a member, the online service architecture 122 is configured to intelligently determine when such notification(s) should be delivered to the member. Furthermore, by engaging in a two-pass filtering process, the online service architecture 122 ensures that available computing resources are used on those notifications that the online service architecture 122 determines to be the most important and/or relevant to a corresponding member. In addition, by efficiently managing when notifications are communicated to a member, the online service architecture 122 also ensures that the computing resources available to the client device 104 are not needlessly expended. For example, the client device 104 may have limited bandwidth (e.g., for receiving notifications), a limited display area (e.g., for displaying notifications), a limited amount of memory (e.g., for receiving, displaying, and/or interacting with notifications), or other limited computing resource, and the efficient spacing of the notifications ensures that the client device 104 does not needlessly expend the computing resources available to it. Thus, this disclosure imparts technical benefits to both client-side devices and the disclosed online service architecture 122.

Modules, Components, and Logic

Certain embodiments are described herein as including logic or a number of components, modules, or mechanisms. Modules may constitute either software modules (e.g., code embodied on a machine-readable medium or machine-readable storage device) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a FPGA or an ASIC. A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different, hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 2-6C are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things" while yet another combination produces a server computer for use within a cloud computing architecture. Not all combinations of such software and hardware architectures are presented here as those of skill in the art can readily understand how to implement the inventive subject matter in different contexts from the disclosure contained herein.

Example Machine Architecture and Machine-Readable Medium

Figure 7:
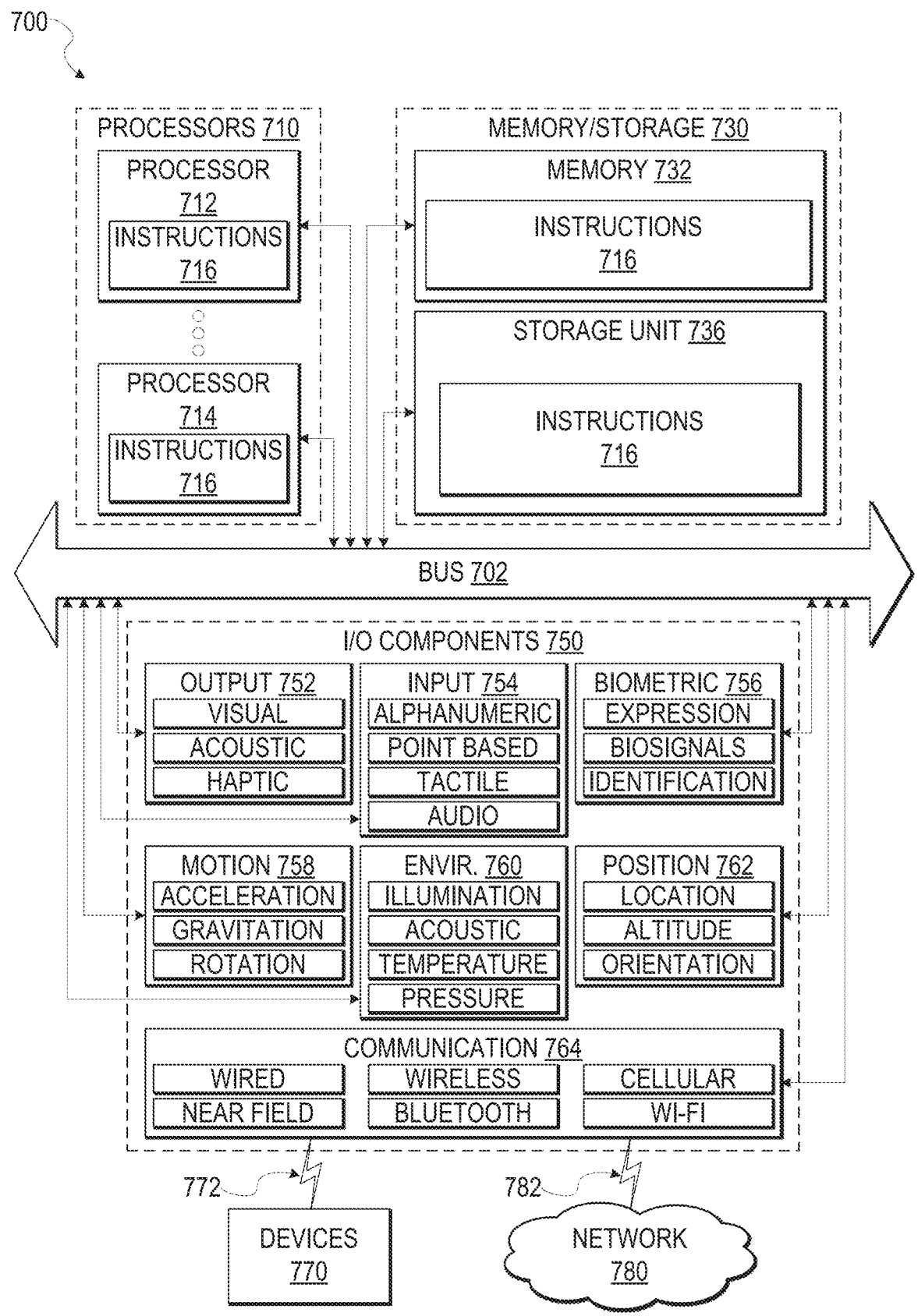
FIG. 7 is a block diagram illustrating components of a machine, according to some example embodiments, able to read instructions from a machine-readable medium (e.g., a machine-readable storage medium or machine-readable storage device) and perform any one or more of the methodologies discussed herein.

FIG. 7 is a block diagram illustrating components of a machine 700, according to some example embodiments, able to read instructions from a machine-readable medium (e.g., a machine-readable storage medium or machine-readable storage device) and perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute the flow diagrams of FIGS. 6A-6C. Additionally, or alternatively, the instructions 716 may implement one or more of the components of FIGS. 2-3. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a PDA, or any machine capable of executing the instructions 716, sequentially or otherwise, that specify actions to be taken by machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory/storage 730, and I/O components 750, which may be configured to communicate with each other such as via a bus 702. In an example embodiment, the processors 710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, processor 712 and processor 714 that may execute the instructions 716. The term "processor" is intended to include multi-core processor that may comprise two or more independent processors (sometimes referred to as "cores") that may execute instructions 716 contemporaneously. Although FIG. 6 shows multiple processors 710, the machine 700 may include a single processor with a single core, a single processor with multiple cores (e.g., a multi-core process), multiple processors with a single core, multiple processors with multiples cores, or any combination thereof.

The memory/storage 730 may include a memory 732, such as a main memory, or other memory storage, and a storage unit 736, both accessible to the processors 710 such as via the bus 702. The storage unit 736 and memory 732 store the instructions 716 embodying any one or more of the methodologies or functions described herein. The instructions 716 may also reside, completely or partially, within the memory 732, within the storage unit 736, within at least one of the processors 710 (e.g., within the processor's cache memory), or any suitable combination thereof, during execution thereof by the machine 700. Accordingly, the memory 732, the storage unit 736, and the memory of processors 710 are examples of machine-readable media.

As used herein, "machine-readable medium" includes a machine-readable storage device able to store instructions 716 and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 716. The term "machine-readable medium" shall also be taken to include any medium, or combination of multiple media, that is capable of storing instructions (e.g., instructions 716) for execution by a machine (e.g., machine 700), such that the instructions, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762 among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 762 may include location sensor components (e.g., a UPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via coupling 782 and coupling 772, respectively. For example, the communication components 764 may include a network interface component or other suitable device to interface with the network 780. In further examples, communication components 764 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a USB).

Moreover, the communication components 764 may detect identifiers or include components operable to detect identifiers. For example, the communication components 764 may include Radio Frequency Identification (REID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, Maxi Code, PDF416, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 780 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 780 or a portion of the network 780 may include a wireless or cellular network and the coupling 782 may be a Code Division Multiple Access (CDMA) connection, a Global System for Mobile communications (GSM) connection, or other type of cellular or wireless coupling. In this example, the coupling 782 may implement any of a variety of types of data transfer technology, such as Single Carrier Radio Transmission Technology (1×RTT), Evolution-Data Optimized (ENDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., hypertext transfer protocol (HTTP)). Similarly, the instructions 716 may be transmitted or received using a transmission medium via the coupling 772 (e.g., a peer-to-peer coupling) to devices 770. The term "transmission medium" shall be taken to include any intangible medium that is capable of storing, encoding, or carrying instructions 716 for execution by the machine 700, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

We claim:

1. A system comprising:
   a machine-readable medium storing computer-executable instructions; and
   at least one hardware processor communicatively coupled to the machine-readable medium that, when the computer-executable instructions are executed, configures the system to:
   retrieve a plurality of notifications, wherein at least one notification identifies a member of an online service to which the notification is to be sent;
   score the plurality of notifications using a first plurality of features to obtain a first plurality of notification scores, the first plurality of features used to score the plurality of notifications designated as offline features that have historically exhibited a low rate of change over time, wherein each notification score is associated with a corresponding notification;
   determine which of the notifications from the plurality of notifications are to be pending notifications based on the corresponding notification score associated with each notification;
   evaluate one or more notification conditions relating to the pending notifications, wherein satisfying at least one notification condition indicates that at least one notification is to be sent from the plurality of pending notifications;
   responsive to determining the evaluated one or more conditions have been satisfied, re-score the plurality of pending notifications using a second plurality of features to obtain a second plurality of notification scores, wherein:
      at least one feature of the second plurality of features is designated as an online feature that has historically exhibited a high rate of change over time and was not included in the first plurality of features; and
      each notification score of the second plurality of notification scores is associated with a corresponding pending notification; and
   communicate at least one notification of the plurality of pending notifications to the member of the online service based on its corresponding notification score selected from the second plurality of notification scores.

2. The system of claim 1, wherein the at least one hardware processor further configures the system to:
   determine a badge count based on the plurality of pending notifications; and
   communicate the badge count for display by a client device operated by the member.

3. The system of claim 1, wherein:
   each notification of the plurality of notifications is associated with a corresponding notification type; and
   evaluation of the one or more notification conditions is based on the notification type associated with at least one notification selected from the plurality of pending notifications.

4. The system of claim 1, wherein:
   the at least one hardware processor further configure the system to:
   identify a first subset of notifications from the plurality of pending notifications as outgoing notifications based on their corresponding notification scores selected from the second plurality of notification scores;
   identify a second subset of notifications from the plurality of pending notification as delayed notifications based on their corresponding notification scores selected from the second plurality of notification scores; and
   the first subset of outgoing notifications are communicated to the member of the online service prior to the communication of the second subset of delayed communications.

5. The system of claim 1, wherein the at least one hardware processor further configures the system to:
   update a member profile notification record corresponding to the member to which the at least one notification was communicated, wherein the update to the member profile notification record includes information about a time at which the at least one notification was sent and a notification type assigned to the at least one notification.

6. A method comprising:
   retrieving, by one or more hardware processors, a plurality of notifications, wherein at least one notification identifies a member of an online service to which the notification is to be sent;
   scoring, by the one or more hardware processors, the plurality of notifications using a first plurality of features to obtain a first plurality of notification scores, the first plurality of features used to score the plurality of notifications designated as offline features that have historically exhibited a low rate of change over time, wherein each notification score is associated with a corresponding notification;
   determining, by the one or more hardware processors, which of the notifications from the plurality of notifications are to be pending notifications based on the corresponding notification score associated with each notification;
   evaluating, by the one or more hardware processors, one or more notification conditions relating to the pending notifications, wherein satisfying at least one notification condition indicates that at least one notification is to be sent from the plurality of pending notifications;
   responsive to determining the evaluated one or more conditions have been satisfied, re-scoring, by the one or more hardware processors, the plurality of pending notifications using a second plurality of features to obtain a second plurality of notification scores, wherein:
      at least one feature of the second plurality of features is designated as an online feature that has historically exhibited a high rate of change over time and was not included in the first plurality of features; and
      each notification score of the second plurality of notification scores is associated with a corresponding pending notification; and
   communicating, by the one or more hardware processors, at least one notification of the plurality of pending notifications to the member of the online service based on its corresponding notification score selected from the second plurality of notification scores.

7. The method of claim 6, further comprising:
   determining, by the one or more hardware processors, a badge count based on the plurality of pending notifications; and
   communicating, by the one or more hardware processors, the badge count for display by a client device operated by the member.

8. The method of claim 6, wherein:
each notification of the plurality of notifications is associated with a corresponding notification type; and
evaluating the one or more notification conditions is based on the notification type associated with at least one notification selected from the plurality of pending notifications.

9. The method of claim 6, further comprising:
identifying, by the one or more hardware processors, a first subset of notifications from the plurality of pending notifications as outgoing notifications based on their corresponding notification scores selected from the second plurality of notification scores; and
identifying, by the one or more hardware processors, a second subset of notifications from the plurality of pending notification as delayed notifications based on their corresponding notification scores selected from the second plurality of notification scores; and
wherein:
the first subset of outgoing notifications are communicated to the member of the online service prior to the communication of the second subset of delayed communications.

10. The method of claim 6, further comprising:
updating, by the one or more hardware processors, a member profile notification record corresponding to the member to which the at least one notification was communicated, wherein the update to the member profile notification record includes information about a time at which the at least one notification was sent and a notification type assigned to the at least one notification.

11. A computer storage device having computer-executable instructions stored thereon that, when executed by one or more hardware processors, causes a system to perform a plurality of operations comprising:
retrieving a plurality of notifications, wherein at least one notification identifies a member of an online service to which the notification is to be sent;
scoring the plurality of notifications using a first plurality of features to obtain a first plurality of notification scores, the first plurality of features used to score the plurality of notifications designated as offline features that have historically exhibited a low rate of change over time, wherein each notification score is associated with a corresponding notification;
determining which of the notifications from the plurality of notifications are to be pending notifications based on the corresponding notification score associated with each notification;
evaluating one or more notification conditions relating to the pending notifications, wherein satisfying at least one notification condition indicates that at least one notification is to be sent from the plurality of pending notifications;
responsive to determining the evaluated one or more conditions have been satisfied, re-scoring the plurality of pending notifications using a second plurality of features to obtain a second plurality of notification scores, wherein:
at least one feature of the second plurality of features is designated as an online feature that has historically exhibited a high rate of change over time and was not included in the first plurality of features; and
each notification score of the second plurality of notification scores is associated with a corresponding pending notification; and
communicating at least one notification of the plurality of pending notifications to the member of the online service based on its corresponding notification score selected from the second plurality of notification scores.

12. The computer storage device of claim 11, wherein the plurality of operations further comprise: determining a badge count based on the plurality of pending notifications; and communicating the badge count for display by a client device operated by the member.

13. The computer storage device of claim 11 wherein:
each notification of the plurality of notifications is associated with a corresponding notification type; and
evaluating the one or more notification conditions is based on the notification type associated with at least one notification selected from the plurality of pending notifications.

14. The computer storage device of claim 11, wherein:
the plurality of operations further comprise:
identifying a first subset of notifications from the plurality of pending notifications as outgoing notifications based on their corresponding notification scores selected from the second plurality of notification scores; and
identifying a second subset of notifications from the plurality of pending notification as delayed notifications based on their corresponding notification scores selected from the second plurality of notification scores; and
the first subset of outgoing notifications are communicated to the member of the online service prior to the communication of the second subset of delayed communications.

* * * * *